Patented Oct. 31, 1950

2,528,398

UNITED STATES PATENT OFFICE 2,528,398

CARBAMATE ESTERS

Franklin Strain, Barberton, Ohio, assignor to Pittsburgh Plate Glass Company, Allegheny County, Pa., a corporation of Pennsylvania No Drawing. Application May 21, 1947, Serial No. 749,591

15 Claims. (Cl. 260—482)

This invention relates to a novel class of carbamate esters which are especially suitable for use as plasticizers and high boiling solvents. It is known that certain carbamates have been prepared previously and applicant has investigated a variety of carbamates. However, it has been found that many of such compounds are unsuitable for many uses because they are crystalline solids which have low compatibility with certain resinous or plastic materials and/or because they are too volatile.

In accordance with the present invention, novel esters have been provided which in general are high boiling liquids of considerably low volatility and high stability. These esters are di-ester-amides of: (a) a secondary amine and (b) a polyglycol bis (acid carbonate) wherein both acid groups of the acid carbonate (b) are converted to their amides with the secondary amine (a). These compounds have the general structure

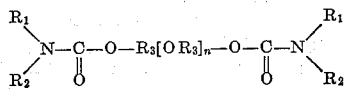

where $R_1$ and $R_2$ are the radicals of a secondary amine

and $R_3$ is the radical of the polyglycol and $n$ is a small whole number not less than 1 denoting the number of units in the polyglycol. They may also be regarded as esters of the polyglycol and an N-disubstituted carbamic acid wherein the hydrogens of the amido group of the carbamic acid are substituted with aliphatic, cycloaliphatic and aryl radicals (preferably containing not more than 18 carbon atoms each) of a secondary amine. These radicals are of course linked to the nitrogen through carbon. Of especial interest are the ester amides of lower secondary aliphatic amines which contain not more than 8 carbon atoms in either group attached to the nitrogen atom of the secondary amine.

These novel compounds are prepared by reaction of a polyglycol bis haloformate such as diethylene glycol dichloroformate or other dihaloformate described and claimed in U. S. Patent 2,370,568 granted to Irving E. Muskat and Franklin Strain, with a secondary amine. In general, it is found necessary to conduit this reaction in the presence of a basic agent or hydrogen chloride acceptor such as an alkaline earth or alkali metal oxide, hydroxide or carbonate, for example, calcium oxide, magnesium oxide, strontium oxide, sodium hydroxide, potassium hydroxide, calcium hydroxide, magnesium hydroxide or the corresponding carbonates or bicarbonates.

Other alkaline agents which may be used include tertiary amines such as pyridine or quinoline. Furthermore, the process may be conducted in the presence of a substantial excess of the secondary amine which is being reacted with the dichloroformate and in such a case the excess of amine acts as a hydrogen chloride acceptor for the purpose of promoting the reaction.

The temperature at which the reaction is conducted depends to a very substantial degree upon the nature of hydrogen chloride acceptor or basic agent which is used. For example, when pyridine or aqueous sodium hydroxide is used as the basic agent, temperatures below 25° C., usually of the order of 0 to 15° C., are found preferable. On the other hand, when calcium carbonate is used as the basic agent, temperatures as high as 50 to 100° C. are found to be desirable. Usually the temperature is such as to maintain the reaction mixture in liquid state.

The process is conducted simply by mixing the reactants in the presence of sufficient basic acting agent to take up evolved HCl while controlling the temperature to prevent overheating. After the reaction has been completed, the carbamate ester normally is recovered by washing out the water soluble components with water or aqueous alkaline solution and thereafter heating the washed product in vacuo until volatile components have been distilled off.

Various secondary amines may be treated. Especially desirable products may be obtained by reaction of the bis chloroformate with a secondary aliphatic or cycloaliphatic hydrocarbon amine such as dimethyl amine, diethyl amine, di-isopropyl amine, di-n-propyl amine, di-n-butyl amine, di-isobutyl amine, diallyl amine, dipropargyl amine, diamyl amine, dioctadecyl amine, ethylene imine, dilauryl amine, dioctyl amine, methyl ethyl amine or dicyclopentyl amine.

These ester amides are miscible with wide ranges of solvent and are compatible in wide ranges with resinous compositions such as polyvinyl chloride, cellulose acetate, etc.

Other amines such as dialkylol amines, for example diethanol amine, dipropanol amine, etc., may be prepared with consequent production of water soluble products.

Liquid products of somewhat lower compatibility may be obtained by the reaction of the bis chloroformate by the reaction with diaryl amines such as diphenyl amine, di-o-tolyl amine, di-n-tolyl amine, di-p-tolyl amine, dibenzyl amine and dinaphthyl amine or aliphatic-aryl amines such as N-ethyl aniline, N-isoamyl aniline, N-isobutyl aniline, N-allyl aniline, N-methyl-o-toluidine or N-methyl-m-toluidine.

As stated above, the invention is concerned with the N-substituted carbamic acid esters of polyglycols. Of particular interest in this respect are the products which are obtained from the bis chloroformates of 1,2-alkylene polyglycols which contain up to 6 glycol units such as diethylene glycol, triethylene glycol, tetraethylene glycol, dipropylene glycol, tripropylene glycol, di-isobutylene glycol, or the corresponding tri-or tetra-isobutylene glycol. However, other esters may be prepared from the polyglycols of other glycols preferably those glycols which contain up to 6 carbon atoms such as the polyglycols of trimethylene glycol, tetramethylene glycol or hexamethylene glycol.

The new class of esters herein contemplated are generally soluble in organic solvents including acetone, ethyl alcohol, ether, toluene, benzene and chloroform. The esters usually are colorless and frequently possess a fairly sweet odor. The compounds are valuable for the plasticizing of various resins and plastic compositions. Typical compositions in which these novel esters are found to be valuable include the cellulose esters and ethers such as cellulose nitrate, cellulose acetate, ethyl cellulose, cellulose acetobutyrate, etc., or the vinyl resins including polymers of vinyl acetate, vinyl chloride, vinyl acetal or vinyl butyral, styrene, methyl methacrylate or diallyl esters such as diallyl carbonate or diallyl phthalate, glycol maleate, glycol fumarate, etc. These new type carbamate esters are especially advantageous because of their low volatility, low water solubility and superior compatability. In these respects, the new esters herein claimed are much superior to the corresponding amides obtained from primary amines.

*Example 1*

Into a 4-liter beaker was placed 438 grams of diethylamine and 504 grams of sodium bicarbonate. Enough ice was added to the mixture to lower the temperature below 10° C. Then, with vigorous stirring, 693 grams of diethylene glycol bis (chloroformate) was slowly added. Additional ice was added to the mixture to maintain a temperature below 10° C. After the addition of the chloroformate was complete, the reaction mixture was allowed to stand with stirring until the mixture warmed to room temperature. The reaction contents were transferred to a separatory funnel and washed free of soluble solid material with equal volumes of cold water. One liter of benzene was added as a solvent and washing continued with equal volumes of one percent pyridine solution until the solution was free of chloroformate. The benzene layer was washed with one percent aqueous HCl solution until the solution was acid and finally with cold water until the solution was free of chloride. The benzene was distilled out, one percent by weight of decolorizing carbon was added and the product heated up to 150° C. at 3 millimeters pressure. On filtering, a clear colorless liquid was obtained.

A 135.4 gram sample of the product obtained from the above preparation was washed with equal volumes of 5% caustic until basic (2 washings) and then with 5% HCl until acidic, (2 washings). The sample was then washed with dilute solutions of sodium bicarbonate followed by cold water washes until neutral. The product was transferred to a still fitted with a Claisen head and distilled at 146–152° C. and a pressure of 2.5–3 millimeters. The properties of this liquid product are as follows:

Refractive index $N_D^{20}$ ------------------ 1.4543
Sp. gravity, 20° C ---------------------- 1.046
Viscosity, 20°, centistokes --------------- 22.1
Surface tension, 20° C., dynes/cm ------- 38.2
Flash point ---------------------------- 363.2
Fire point ----------------------------- 392

This compound has the probable structure

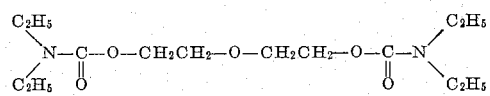

Similar esters which have somewhat higher boiling points may be prepared by use of triethylene glycol bis chloroformate, tetraethylene glycol bis chloroformate or dipropylene glycol bis chloroformate in lieu of diethylene glycol bis chloroformate in this example.

*Example 2*

Into a 4-liter beaker was placed 551.3 grams of di-n-butylamine and 360 grams of sodium bicarbonate. Enough ice was added to maintain the temperature below 10° C. With vigorous stirring, 494.3 grams of diethylene glycol bis (chloroformate) was slowly added. Ice was added to keep the temperature below 10° C. After the addition of the chloroformate was complete, the mixture was allowed to stand with stirring for one hour. At the end of this period carbon dioxide continued to be evolved and approximately 100 grams additional $NaHCO_3$ was added and the mixture was allowed to stand over night. The reaction mixture was transferred to a separatory funnel and 1 liter of ethylene dichloride was added. This mixture was washed with water and then with one percent aqueous pyridine until the mixture was free of chloroformate chlorine. Thereafter, the product was washed with one percent aqueous HCl solution until the mixture was acidic and finally with water until the product was free of chloride. Five percent by weight of decolorizing carbon was added and the resulting mixture was heated up to 170° C. at 5 millimeters pressure and filtered.

The resulting product is a clear colorless liquid having the following properties:

Refractive index $N_D^{20}$ ------------------ 1.4552
Sp. gravity, 20° C ---------------------- .972
Viscosity, 20° C., centistokes ----------- 54.8
Flash point, °F ------------------------ 417.2
Fire point, °F ------------------------- 447.8

This compound has the probable structure:

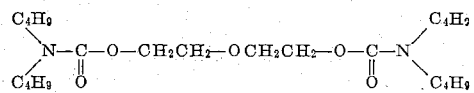

Example 3

To a stirred mixture of 50.5 grams of diethanolamine, 42.5 grams of sodium bicarbonate and 100 milliliters of water was added 58 grams of diethylene glycol dichloroformate in the course of one hour and the temperature during the addition was maintained at 5–10° C. After the addition had been completed dilute aqueous hydrochloric acid was added in amount sufficient to raise the pH of the solution to 3. The clear solution was extracted with ether. Only a trace of oily material was found in the ether extract upon evaporation. Acetone (200 milliliters) was added to precipitate most of the salt from the solution. The filtrate from the salt separation was evaporated to dryness at reduced pressure. The resultant cake was extracted with 300 milliliters of acetone and the remaining salt was separated by filtration. The acetone was distilled off and the product heated at 100° C. and a pressure of 10 millimeters for one hour. A very viscous, yellowish syrup remained in the flask. This color was removed by heating with decolorizing carbon. The product is a viscous essentially colorless liquid which is soluble in water and acetone but essentially insoluble in ether. The product has the probable structure

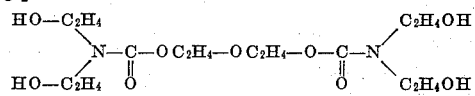

This product is quite hygroscopic and differs in this respect and in its high water solubility from the products of corresponding hydrocarbon amines.

The following table indicates pertinent properties of other carbamates prepared according to this invention:

| Compound | Refractive Index $N_D^{20}$ | Sp. Gravity 20/4° C. | Viscosity 20° C., Centistokes |
| --- | --- | --- | --- |
| Diethylene glycol bis (N,N' Di-isopropyl carbamate) | 1.4544 | 1.018 | 133.6 |
| Diethylene glycol bis (N,N' Di-n-Butyl carbamate) | 1.4552 | 0.972 | 54.8 |
| Triethylene glycol bis (N,N' Di-n-Butyl carbamate) | 1.4565 | 1.012 | 64.8 |
| Tetraethylene glycol bis (N,N' Di-n-Butyl carbamate) | 1.4579 | 1.009 | 67.8 |
| Diethylene glycol bis (N,N' Diisobutyl carbamate) | 1.4528 | 0.968 | 122.2 |
| Diethylene glycol bis (N,N' 2-Ethyl Hexyl carbamate) | 1.4647 | 0.958 | 618.7 |

Although the present invention has been described with particular reference to the specific details of certain embodiments thereof, such details should not be regarded as limitations upon the scope of the invention except insofar as included in the accompanying claims.

This application is a continuation-in-part of my copending application, Serial No. 644,427, filed January 30, 1946.

What is claimed:

1. A di-esteramide of: (a) a secondary hydrocarbon monoamine which contains up to 18 carbon atoms in each hydrocarbon group and (b) a polyglycol bis (acid carbonate) said glycol containing 2 to 6 glycol units, the glycol units containing no more than 6 carbon atoms wherein both acid groups of the acid carbonate (b) are amidated with the secondary amine (a).

2. A di-esteramide of: (a) a secondary hydrocarbon monoamine which contains up to 18 carbon atoms in each hydrocarbon group and (b) a 1,2-alkylene polyglycol bis (acid carbonate) said polyglycol containing 2 to 6 glycol units, the glycol units containing no more than 6 carbon atoms wherein both acid groups of (a) are amidated with (b).

3. A di-esteramide of: (a) a secondary hydrocarbon aliphatic monoamine containing up to 8 carbon atoms in each hydrocarbon radical and (b) a polyglycol bis (acid carbonate) said polyglycol containing 2 to 6 glycol units, the glycol units containing no more than 6 carbon atoms, wherein both acid groups of the acid carbonate (b) are amidated with the secondary amine (a).

4. A di-esteramide of: (a) a secondary hydrocarbon monoamine containing up to 18 carbon atoms in each hydrocarbon radical and (b) an ethylene polyglycol bis (acid carbonate) said polyglycol containing 2 to 6 glycol units, the glycol units containing no more than six carbon atoms, wherein both acid groups of the acid carbonate (b) are amidated with the secondary amine.

5. A di-esteramide of: (a) a secondary hydrocarbon aliphatic monoamine containing up to 8 carbon atoms in each hydrocarbon radical and (b) a diethylene glycol bis (acid carbonate) wherein both acid groups of the acid carbonate (b) are amidated with the secondary amine (a).

6. A di-esteramide of: (a) a secondary hydrocarbon aliphatic amine which contains at least 3 but not more than 18 carbon atoms in each aliphatic group linked to nitrogen and (b) a diethylene glycol bis (acid carbonate) wherein both acid groups of (b) are amidated with (a).

7. Diethylene glycol bis (N,N' diethyl carbamate).

8. Diethylene glycol bis (N,N' dibutyl carbamate).

9. A polyalkylene glycol bis (N,N' dialkyl carbamate); the glycol containing 2 to 6 glycol units, the glycol units containing no more than 6 carbon atoms and the alkyl groups containing up to 8 carbon atoms in each alkyl radical.

10. A polyethylene glycol bis (N,N' dialkyl carbamate); the alkyl groups containing up to 8 carbon atoms in each alkyl radical.

11. A method of preparing a di-esteramide of: (a) a secondary amine and (b) a polyglycol bis (acid carbonate) wherein both acid groups of the acid carbonate (b) are amidated with the secondary amine (a) which comprises reacting a polyglycol bis-haloformate with a secondary amine in the presence of a basic agent in the proportion of 1 mole of the haloformate to 2 moles of the secondary amine.

12. A method of preparing a di-esteramide of: (a) a secondary amine and (b) a polyglycol bis (acid carbonate) wherein both acid groups of the acid carbonate (b) are amidated with the secondary amine (a) which comprises reacting a polyglycol bis-chloroformate with a secondary amine in the presence of a basic agent in the proportion of 1 mole of the haloformate to 2 moles of the secondary amine.

13. The compounds having the structure

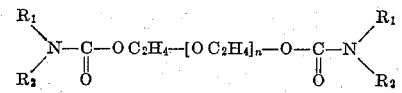

where $R_1$ and $R_2$ are aliphatic hydrocarbon radicals which contain up to 8 carbon atoms and $n$ is a small whole number not larger than 6.

14. The method of preparing a diester amide which comprises reacting a bis haloformate of a polyglycol containing up to 6 glycol units, the units containing up to 6 carbon atoms with an aliphatic hydrocarbon amine containing up to 18 carbon atoms in each radical, in the presence of a basic agent, in the proportion of 2 moles of amine to one mole of chloroformate.

15. The process of claim 14 wherein the chloroformate is diethylene glycol bis chloroformate.

FRANKLIN STRAIN.

REFERENCES CITED

The following references are of record in the file of this patent:

UNITED STATES PATENTS

| Number | Name | Date |
|---|---|---|
| 1,817,992 | Leopold et al. | Aug. 11, 1931 |
| 1,927,858 | Ulrich et al. | Sept. 26, 1933 |
| 2,197,479 | Meigs | Apr. 16, 1940 |
| 2,401,549 | Chenicek | June 4, 1946 |

FOREIGN PATENTS

| Number | Country | Date |
|---|---|---|
| 378,390 | Great Britain | Aug. 8, 1933 |